United States Patent
Ryou et al.

(10) Patent No.: US 8,608,975 B2
(45) Date of Patent: Dec. 17, 2013

(54) FERRITE FOR HIGH-FREQUENCY APPLICATIONS AND MANUFACTURING METHOD THEREOF

(75) Inventors: Byung Hoon Ryou, Seoul (KR); Won Mo Sung, Siheung-si (KR); Sang Hoon Park, Seoul (KR)

(73) Assignee: EMW Co., Ltd., Incheon (KR)

( * ) Notice: Subject to any disclaimer, the term of this patent is extended or adjusted under 35 U.S.C. 154(b) by 192 days.

(21) Appl. No.: 13/130,750

(22) PCT Filed: Nov. 18, 2009

(86) PCT No.: PCT/KR2009/006786
§ 371 (c)(1),
(2), (4) Date: Aug. 15, 2011

(87) PCT Pub. No.: WO2010/058952
PCT Pub. Date: May 27, 2010

(65) Prior Publication Data
US 2012/0018663 A1     Jan. 26, 2012

(30) Foreign Application Priority Data
Nov. 24, 2008 (KR) ........................ 10-2008-0117043

(51) Int. Cl.
*H01F 3/00* (2006.01)
(52) U.S. Cl.
USPC ................. 252/62.2; 252/62.64; 343/787
(58) Field of Classification Search
USPC ................. 252/62.6, 62.64; 343/787
See application file for complete search history.

(56) References Cited

U.S. PATENT DOCUMENTS 3,074,888 A    1/1963    Carter

FOREIGN PATENT DOCUMENTS

JP    2001-298225 A    10/2001
KR    10-2005-0098705 A    10/2005

OTHER PUBLICATIONS

Greifer et al., "Rectangular Hysteresis Loop Ferrites with Large Barkhausen Steps", Jour. App. Phys., vol. 31, No. 1, Jan. 1960, pp. 85-88.*
S. Kainuma, "Magnetic Hysteresis Loops and Induced Anisotropy in the System Mg1-xCuxFe2O4", Jap. Jour. App. Phys., vol. 15, No. 6, Jun. 1976, pp. 1079-1085.*
Patil et al., "Conductivity and Cation Distribution in CuxMg(1-x)Fe2O4 System", Czech. Joun. Phys., vol. 42 (1992), No. 9, pp. 939-945.*
PCT International Search Report for PCT Counterpart Application No. PCT/KR2009/006786 containing Communication relating to the Results of the Partial International Search Report, 4 pgs., (Jul. 1, 2010).
A. Pradeep, et al., "FTIR Study of Ni, Cu and Zn Substituted Nano-Particles of $MgFe_2O_4$", Material Letters, vol. 60, Issue 3, pp. 371-374, (Feb. 2006).

* cited by examiner

*Primary Examiner* — Carol M Koslow
(74) *Attorney, Agent, or Firm* — The PL Law Group, PLLC

(57) ABSTRACT

Disclosed are a ferrite for high-frequency applications and a manufacturing method thereof. The ferrite comprises the elements Mg, Cu, Fe, and O, in which the elements have a composition ratio represented by the formula $Mg_{1-x}Cu_xFe_2O_4$, wherein x has a value of 0.1 or less.

5 Claims, 2 Drawing Sheets

200

| 30MHz | $MgFe_2O_4$ | | $Mg_{1-x}Cu_xFe_2O_4 (X=0.1)$ | | |
|---|---|---|---|---|---|
| heat-treatment conditions | 1,250°C | 1,350°C | 1,250°C | 1,350°C | 1,250°C |
| alginate | - | - | - | - | 1 wt% |
| permittivity | 8.9 | 11.1 | 9.9 | 10.5 | 9.5 |
| permeability | 5.6 | 9.1 | 9.1 | 10.0 | 9.5 |
| ratio | 1.59 | 1.23 | 1.09 | 1.05 | 1 |

FIG. 2

| 30MHz | MgFe$_2$O$_4$ | | Mg$_{1-x}$Cu$_x$Fe$_2$O$_4$ (X = 0.1) | | |
|---|---|---|---|---|---|
| heat-treatment conditions | 1,250°C | 1,350°C | 1,250°C | 1,350°C | 1,250°C |
| alginate | - | - | - | - | 1 wt% |
| permittivity | 8.9 | 11.1 | 9.9 | 10.5 | 9.5 — 201 |
| permeability | 5.6 | 9.1 | 9.1 | 10.0 | 9.5 — 202 |
| ratio | 1.59 | 1.23 | 1.09 | 1.05 | 1 — 203 |

— 1 —

FERRITE FOR HIGH-FREQUENCY APPLICATIONS AND MANUFACTURING METHOD THEREOF

CROSS-REFERENCE TO RELATED APPLICATIONS

This patent application is a U.S. National Phase application under 35 U.S.C. §371 of International Application No. PCT/KR2009/006786, filed Nov. 18, 2009, entitled FERRITE FOR HIGH FREQUENCY APPLICATION, AND METHOD FOR MANUFACTURING THE FERRITE, which claims priority to Korean patent application number 10-2008-0117043, filed Nov. 24, 2008.

TECHNICAL FIELD

Embodiments according to the present invention relate to a ferrite for high-frequency applications and a manufacturing method thereof.

BACKGROUND ART

In order to facilitate the impedance matching of a magnetic material with free space, the permittivity-to-permeability ratio of the magnetic material should be close to 1. To make the permittivity to permeability ratio close to 1, a method of increasing the values of permittivity and permeability by high-temperature heat-treatment is used. Specifically, the permittivity to permeability ratio can be controlled by increasing permeability as a result of facilitating the growth of grain boundaries by increasing heat-treatment temperature. However, an increase in heat-treatment temperature leads not only to an increase in permeability, but also to an increase in permittivity, thus increasing both permeability and permittivity, In addition, this increase in heat-treatment temperature can result in a decrease in resonant frequency and can make the production process and system cost-ineffective. For this reason, preparation conditions in which the permittivity-to-permeability ratio close to 1 can be attained even by low-temperature heat treatment are required. The present invention proposes a ferrite for high-frequency applications, which is an artificial magnetic material, and a manufacturing method thereof.

SUMMARY

The present invention provides a ferrite having permeability and permeability values of 10 or less and a permittivity-to-permeability ratio close to 1, in which the ferrite is manufactured by adding the element Cu to a base composition consisting of magnesium ferrite and heat-treating the mixture at a temperature lower than the heat-treatment temperature of the magnesium-ferrite.

A ferrite according to one aspect of the present invention comprises the elements Mg, Cu, Fe and O, in which the elements have a composition ratio represented by the formula $Mg_{1-x}Cu_xFe_2O_4$, wherein X has a value of 0.1 or less.

According to one embodiment of the present invention, the ferrite may contain 1 wt % or less of alginate.

According to one embodiment of the present invention, the ferrite may be obtained by crystallization at a temperature of 1,250° C. or lower.

According to one embodiment of the present invention, the ferrite may have permittivity and permeability values of 10 or less and a permittivity-to-permeability ratio between 1 and 1.05.

A method for manufacturing a ferrite according to one aspect of the present invention comprises the steps of: mixing materials for the elements Mg, Cu, Fe and O; calcining the mixed material at a temperature of 1,000° C. or lower; and sintering the calcined material at a temperature of 1,250° C. or lower, wherein the materials are mixed so as to provide a composition ratio corresponding to the formula $Mg_{1-x}Cu_xFe_2O_4$, wherein x has a value of 0.1 or less.

According to the present invention, the element Cu is added to a base composition consisting of magnesium-ferrite, and the mixture is heat-treated at a temperature lower than the heat-treatment temperature of the magnesium ferrite, whereby a ferrite can be obtained which has permittivity and permeability values of 10 or less and a permittivity-to-permeability ratio close to 1.

BRIEF DESCRIPTION OF DRAWINGS

FIG. 2 is a table showing information about the permittivity and permeability of each of a ferrite according to one embodiment of the present invention and a magnesium ferrite as a function of heat-treatment conditions.

DETAILED DESCRIPTION

Figure 1:
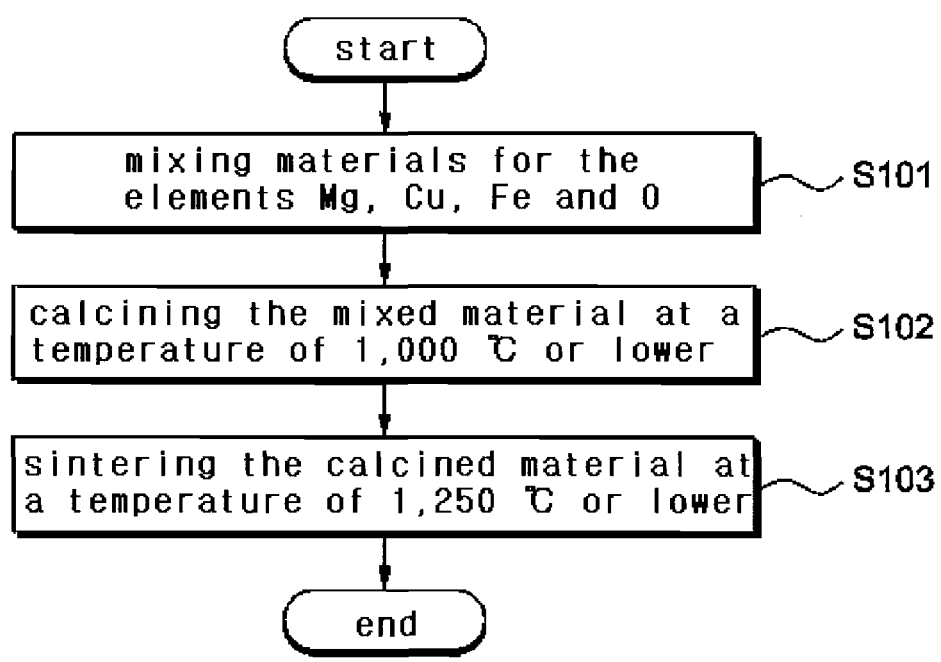
FIG. 1 is a flow chart showing a method for manufacturing a ferrite according to one embodiment of the present invention.

Hereinafter, various embodiments of the present invention will be described in detail with reference to the accompanying drawings.

A ferrite according to one embodiment of the present invention comprises the elements Mg, Cu, Fe and O, in which the elements have a composition ratio represented by the formula $Mg_{1-x}Cu_xFe_2O_4$, wherein x has a value of 0.1 or less. Also, the ferrite may contain 1 wt % or less of alginate and can be crystallized at a temperature of 1,250° C. or lower. This ferrite can have permittivity and permeability values of 10 or less and a permittivity-to-permeability ratio between 1 and 1.05. Specifically, the ferrite can be manufactured by adding the element Cu to a base composition consisting of magnesium ferrite so as to provide the composition ratio represented by the above formula and carrying out the process shown in FIG. 1.

FIG. 1 is a flow chart showing a method for manufacturing a ferrite according to one embodiment of the present invention. As shown in FIG. 1, the manufacturing method according to this embodiment at least comprises the steps of: (S101) mixing materials for the elements Mg, Cu, Fe and O; (S102) calcining the mixed material at a temperature of 1,000° C. or lower; and (S103) sintering the calcined material at a temperature of 1,250° C. or lower. Herein, the materials are mixed so as to provide a composition ratio corresponding to the formula $Mg_{1-x}Cu_xFe_2O_4$, wherein x has a value of 0.1 or less.

For example, the materials for the elements Mg, Cu, Fe and O can be mixed with each other so as to provide the composition ratio having the above formula and can be calcined using a solid-phase reaction process for 48 hours. In this calcining process, deionized water or alcohol can be used. The manufacturing method of the present invention may comprise, between step (S101) and step (S102), processes such as grinding and shaping processes, which are generally carried out during the manufacture ferrites. The processes such as grinding or shaping processes can be carried out using various methods, and step (S101) and step (S102) of the manufacturing method of the present invention can be carried out using at least one of known methods.

In step (S103), 1 wt % or less of alginate may be added to the calcined material. When alginate is added to the calcined material, the permittivity-to-permeability ratio of the ferrite according to the present invention can be closer to 1.

FIG. 2 is a table showing information about the permittivity and permeability of each of a ferrite according to one embodiment of the present invention and a magnesium ferrite as a function of heat-treatment conditions. Specifically, a table 200 shows the permittivity, permeability and permittivity-to-permeability ratio of each of a magnesium ferrite represented by the formula $MgFe_2O_4$ and the ferrite according to this embodiment as a function of heat-treatment conditions and the addition of alginate. Herein, the term. "heat-treatment conditions" may mean sintering temperatures.

In FIG. 2, a first dotted-line oval 201, a second dotted-line oval 202 and a third dotted-line oval 203 indicate a permittivity of 9.5, a permeability of 9.5 and a permittivity to-permeability ratio of 1.00, respectively, for the ferrite manufactured by mixing materials for the elements Mg, Cu, Fe and O so as to provide a composition represented by the formula $Mg_{1-x}Fe_2O_4$ (x=0.1) and sintering the mixture at a temperature of 1,250° C. so as to be crystallized while adding 1 wt % of alginate during the sintering process. This indicates that the ferrite has a permittivity-to-permeability ratio close to 1 and permittivity and permeability values of 10 or less.

As described above, according to the embodiment of the present invention, the element Cu is added to the base composition consisting of magnesium ferrite, and the mixture is heat-treated at a temperature lower than the heat-treatment temperature of the magnesium ferrite, whereby the ferrite can have permittivity and permeability values of 10 or less and a permittivity-to-permeability ratio close to 1.

In addition, the ferrite according to this embodiment can be used for antennas and the like. For example, in the case of internal antennas, a method of winding a coil around a magnetic material such as the above ferrite can be used for miniaturization of the internal antenna.

Although the present invention has been described above in connection with specific items, such as detailed elements, limited embodiments, and the drawings, they are provided to help the general understanding of the present invention and the present invention is not limited to the above embodiments. Those skilled in the art can modify the present invention in various ways from the above description.

Accordingly, the scope of the present invention should not be limited to the above-described embodiments, but should be defined within the scope of the appended claims and equivalent thereof.

What is claimed is:

1. An antenna comprising a ferrite comprising the elements Mg, Cu, Fe and O, in which the elements have a composition ratio represented by the formula $Mg_{1-x}Cu_xFe_2O_4$, wherein x has a value of 0.1 or less.

2. The antenna of claim 1, wherein the ferrite is obtained by crystallization at a temperature of 1,250° C. or lower.

3. The antenna of claim 1, wherein the ferrite has permittivity and permeability values of 10 or less and a permittivity-to-permeability ratio between 1 and 1.05.

4. A method for manufacturing a ferrite, the method comprising:
mixing materials for the elements Mg, Cu, Fe and O;
calcining the mixed material at a temperature of 1,000° C. or lower; and
sintering the calcined material at a temperature of 1,250° C. or lower, and adding 1 wt % or less of alginate to the calcined material during the sintering,
wherein the materials are mixed so as to provide a composition ratio corresponding to the formula $Mg_{1-x}Cu_xFe_2O_4$, wherein x has a value of 0.1 or less.

5. A ferrite manufactured by the method of claim 4.

* * * * *